(12) United States Patent
Thompson

(10) Patent No.: US 6,918,619 B2
(45) Date of Patent: Jul. 19, 2005

(54) PIPE CONNECTING ASSEMBLY AND METHOD OF USE

(75) Inventor: Jeffrey Lee Thompson, Seattle, WA (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 10/064,244

(22) Filed: Jun. 25, 2002

(65) Prior Publication Data

US 2003/0234541 A1 Dec. 25, 2003

(51) Int. Cl.[7] .................................................. F16L 23/00
(52) U.S. Cl. ....................... 285/412; 285/413; 285/278; 29/890.14
(58) Field of Search ............................... 285/412, 413, 285/368, 278, 279, 280, 363; 29/890.14, 890.141

(56) References Cited

U.S. PATENT DOCUMENTS

| | | | | |
|---|---|---|---|---|
| 24,809 A | * | 7/1859 | Knowlton | .................. 285/412 |
| 98,717 A | * | 1/1870 | Smith | ........................ 285/412 |
| 1,607,254 A | * | 11/1926 | Fantz | ......................... 285/368 |
| 1,662,954 A | * | 3/1928 | Broido | ....................... 285/368 |
| 2,461,856 A | * | 2/1949 | Tornberg | .................. 285/412 |
| 2,687,229 A | | 8/1954 | Laurent | |
| 3,165,339 A | * | 1/1965 | Faccou | ...................... 285/368 |
| 3,175,851 A | * | 3/1965 | McMurray | ................. 285/368 |
| 4,238,291 A | | 12/1980 | Neuenfeldt et al. | |
| 4,452,474 A | | 6/1984 | Hagner | |
| 4,640,537 A | * | 2/1987 | Chaix et al. | ................ 285/368 |
| 4,648,632 A | | 3/1987 | Hagner | |
| 4,730,852 A | * | 3/1988 | Arscott | ....................... 285/412 |
| 4,762,330 A | * | 8/1988 | Lonne et al. | ............... 285/368 |
| 4,840,409 A | | 6/1989 | Welkey | |
| 5,024,585 A | * | 6/1991 | Kralovec | .................... 285/412 |
| 5,050,913 A | | 9/1991 | Lenz | |
| 5,192,095 A | | 3/1993 | Behrens | |
| 5,374,086 A | * | 12/1994 | Higgins | ..................... 285/368 |
| 5,737,380 A | | 4/1998 | Deaver et al. | |
| 5,779,282 A | * | 7/1998 | Ezze | ......................... 285/368 |

FOREIGN PATENT DOCUMENTS

| | | | | |
|---|---|---|---|---|
| DE | 3820379 | * | 1/1989 | ................ 285/368 |
| JP | 0013259 | * | 1/1983 | ................ 254/412 |

* cited by examiner

Primary Examiner—David Bochna
(74) Attorney, Agent, or Firm—Armstrong Teasdale LLP

(57) ABSTRACT

A pipe coupling assembly includes a first and a second pipe coupling member with the first coupling member including a cylindrical flange and a spherical convex seat portion, and the second coupling member including a cylindrical flange and a spherical concave seat portion. Each flange includes a first plurality of pivot notches. The coupling assembly further includes a first and a second cylindrical spring ring. Each spring ring includes a body having a first surface and an opposing second surface. The body includes a main bore and a plurality of bolt bores extending therethrough. A plurality of pivot bearings extend from the first surface with each pivot bearing configured to engage a pipe section flange notch. A plurality of bolt bore seats are located in the second surface and coaxially aligned with the bolt bores.

15 Claims, 3 Drawing Sheets

PIPE CONNECTING ASSEMBLY AND METHOD OF USE

BACKGROUND OF INVENTION

This invention relates generally to nuclear reactors and more particularly, to assemblies and methods for coupling piping within reactor pressure vessels of such reactors.

A reactor pressure vessel (RPV) of a boiling water reactor (BWR) typically has a generally cylindrical shape and is closed at both ends by a bottom head and a removable top head. A core shroud, or shroud, typically surrounds the core and is supported by a shroud support structure. Particularly, the shroud has a generally cylindrical shape and surrounds both the core plate and the top guide. There is a space or annulus located between the cylindrical reactor pressure vessel and the cylindrically shaped shroud.

Boiling water reactors have numerous piping systems which are utilized, for example, to transport water throughout the RPV. Known boiling water reactors include a core spray system to deliver cooling water to the reactor core during a loss of coolant accident. The core spray system, including piping, downcomers, T-box assemblies, and core spray spargers, is used to deliver water from outside the RPV to inside the RPV. The core spray system provides water to the reactor core.

Stress corrosion cracking (SCC) is a known phenomenon occurring in reactor components exposed to high temperature water, such as structural members, piping, fasteners, and welds. The reactor components are subject to a variety of stresses associated with, for example, differences in thermal expansion, the operating pressure needed for the containment of the reactor cooling water, and other sources such as residual stresses from welding, cold working and other inhomogeneous metal treatments. In addition, water chemistry, welding, heat treatment, and radiation can increase the susceptibility of metal in a component to SCC.

Reactor internal piping, such as core spray spargers and T-box assemblies, occasionally requires replacement as a result of SCC or for other reasons. Replacing the spray spargers sometimes requires removing and replacing T-box assemblies, and core spray piping, including downcomers. Replacement of spray spargers, T-boxes, and downcomers is complicated by the limited working space, high radiation levels, and difficulties associated with welding to a highly radioactive shroud.

Internal reactor coolant piping must remain leak resistant when cool water is injected into the reactor vessel. The injection of cool water through the inside of the pipe results in thermal contraction of the pipe relative to bolted pipe couplings. The contraction of the pipe relative to the coupling bolts can result in loss of bolt tension. Loss of bolt tension reduces coupling seal seating force reducing the leak resistance of the seal.

To obtain elastic compliance to accommodate differential thermal expansion and still maintain seal seating forces, long slender Inconel® bolts of high strength are typically employed. The Inconel® bolting material is susceptible to intergranular stress corrosion cracking (IGSCC) at high stresses. Bolt preload must, therefore, be carefully controlled, limiting the seating forces that can be applied during coolant injection.

SUMMARY OF INVENTION

In one aspect, a pipe coupling assembly is provided that includes a first pipe section having a first coupling member located at one end with the first coupling member including a cylindrical flange and a spherical convex seat portion. The flange includes a first plurality of pivot notches. The assembly also includes a second pipe section having a second coupling member located at one end with the second coupling member including a cylindrical flange and a spherical concave seat portion. The second coupling member flange includes a second plurality of pivot notches, and the concave seat portion is configured to receive the first convex seat portion. The coupling assembly further includes a first and a second cylindrical spring ring. Each spring ring includes a body having a first surface and an opposing second surface. The body includes a main bore and a plurality of bolt bores extending therethrough. The main bore is configured to receive a pipe section therethrough, and each bolt bore is configured to receive a fastener therethrough. A plurality of pivot bearings extend from the first surface with each pivot bearing configured to engage a pipe section flange notch. A plurality of bolt bore seats are located in the second surface and coaxially aligned with the bolt bores. Each bolt bore seat is configured to receive a portion of a fastener.

In another aspect a coupling spring ring for coupling a first pipe section flange to second pipe section flange in a nuclear reactor is provided. Each flange includes at least one notch, and the spring ring includes a body having a first surface and an opposing second surface. The body includes a main bore and a plurality of bolt bores extending therethrough. The main bore is configured to receive a pipe section therethrough, and each bolt bore is configured to receive a fastener therethrough. A plurality of pivot bearings extend from the first surface with each pivot bearing configured to engage a pipe section flange notch. A plurality of bolt bore seats are located in the second surface and coaxially aligned with the bolt bores.

In another aspect a method of joining two pipe sections in a nuclear reactor is provided. A first pipe section includes a first coupling member located at an end of the first pipe section and includes a cylindrical flange and a spherical convex seat portion. The flange includes a first plurality of pivot notches. A second pipe section includes a second coupling member located at an end of the second pipe section and includes a cylindrical flange and a spherical concave seat portion. The second coupling member flange includes a second plurality of pivot notches, and the concave seat portion is configured to receive the first convex seat portion. The method includes seating a first spring ring on the first pipe section, seating a second spring ring on the second pipe section, and coupling the first spring ring to the second spring ring with at least two bolts. Each spring ring includes a body having a first surface and an opposing second surface. The body includes a main bore and a plurality of bolt bores extending therethrough. The main bore is configured to receive a pipe section therethrough, and each bolt bore is configured to receive a fastener therethrough. A plurality of pivot bearings extend from the first surface with each pivot bearing configured to engage a pipe section flange notch. A plurality of bolt bore seats are located in the second surface and are coaxially aligned with the bolt bores.

DETAILED DESCRIPTION

A pipe coupling assembly is described in detail below. The coupling assembly includes, in an exemplary embodiment, two spring rings connected by bolts with spherical seats. The spring rings include pivot bearings which mate with corresponding pivot seats or notches in the pipe coupling. The arrangement of the bolts and pivot bearings places the rings in torsion and provides bending loads in a manner which maximizes the compliance of the coupling connectors in order to minimize the loss of sealing forces during thermal expansion. The torsion rings eliminate the need for bolt flexibility and permit the use of shorter bolts made from crack resistant material.

Figure 1:
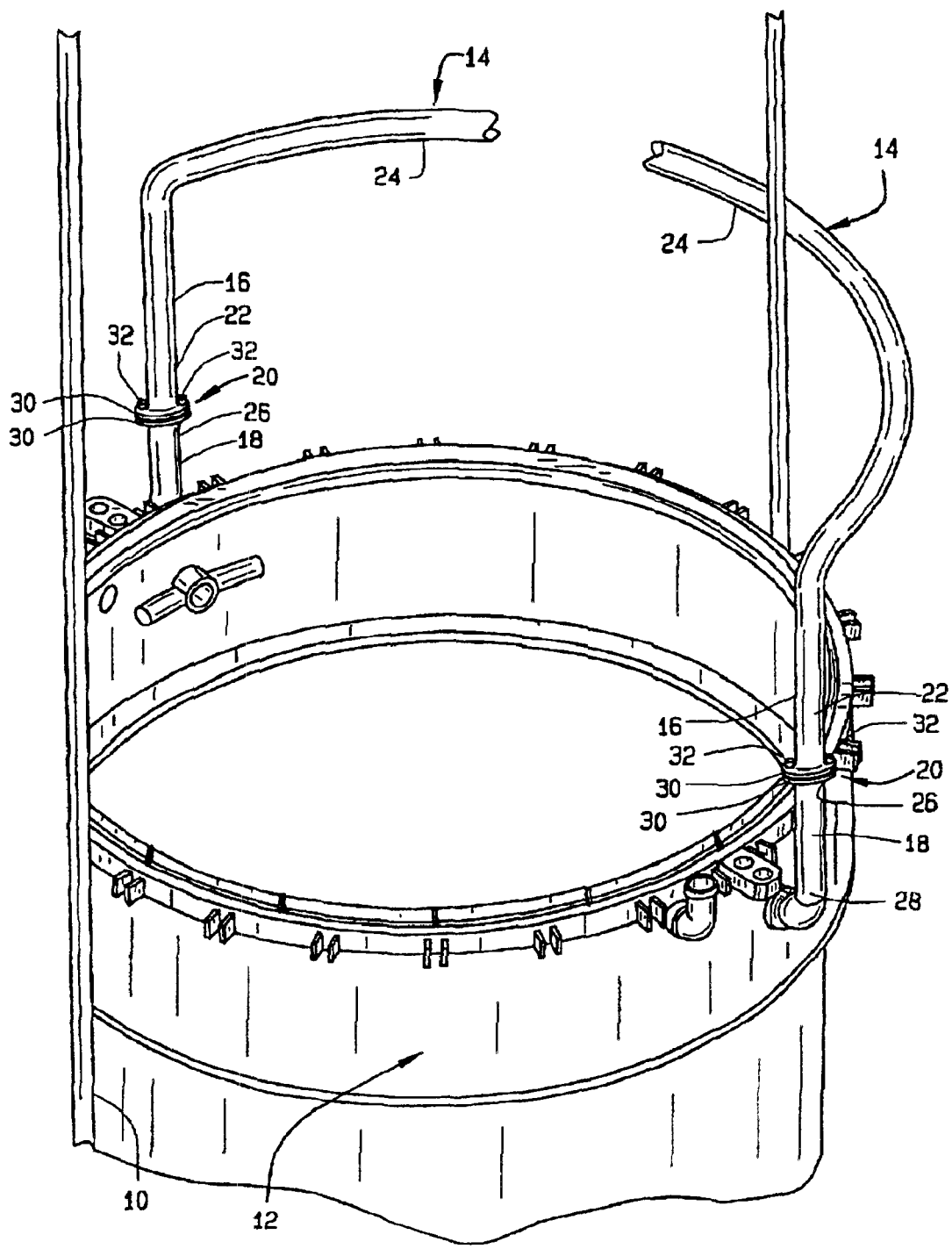
FIG. 1 is a perspective view, with parts cut away, of a reactor pressure vessel.

Referring now to the drawings, FIG. 1 is a perspective view, with parts cut away, of a reactor pressure vessel (PRV) 10 that includes a shroud 12 and internal reactor pipes 14. Each pipe 14 includes a first pipe section 16, a second pipe section 18, and a pipe coupling assembly 20.

Each first pipe section 16 has a first end 22 and a second end 24, and each second pipe section 18 has a first end 26, a second end 28. Each pipe coupling assembly 20 includes first and second spring rings 30 and fasteners or bolts 32. In one exemplary embodiment, each pipe coupling assembly 20 includes at least two bolts 32. In another embodiment, each pipe coupling assembly 20 includes at least four bolts 32.

Figure 2:
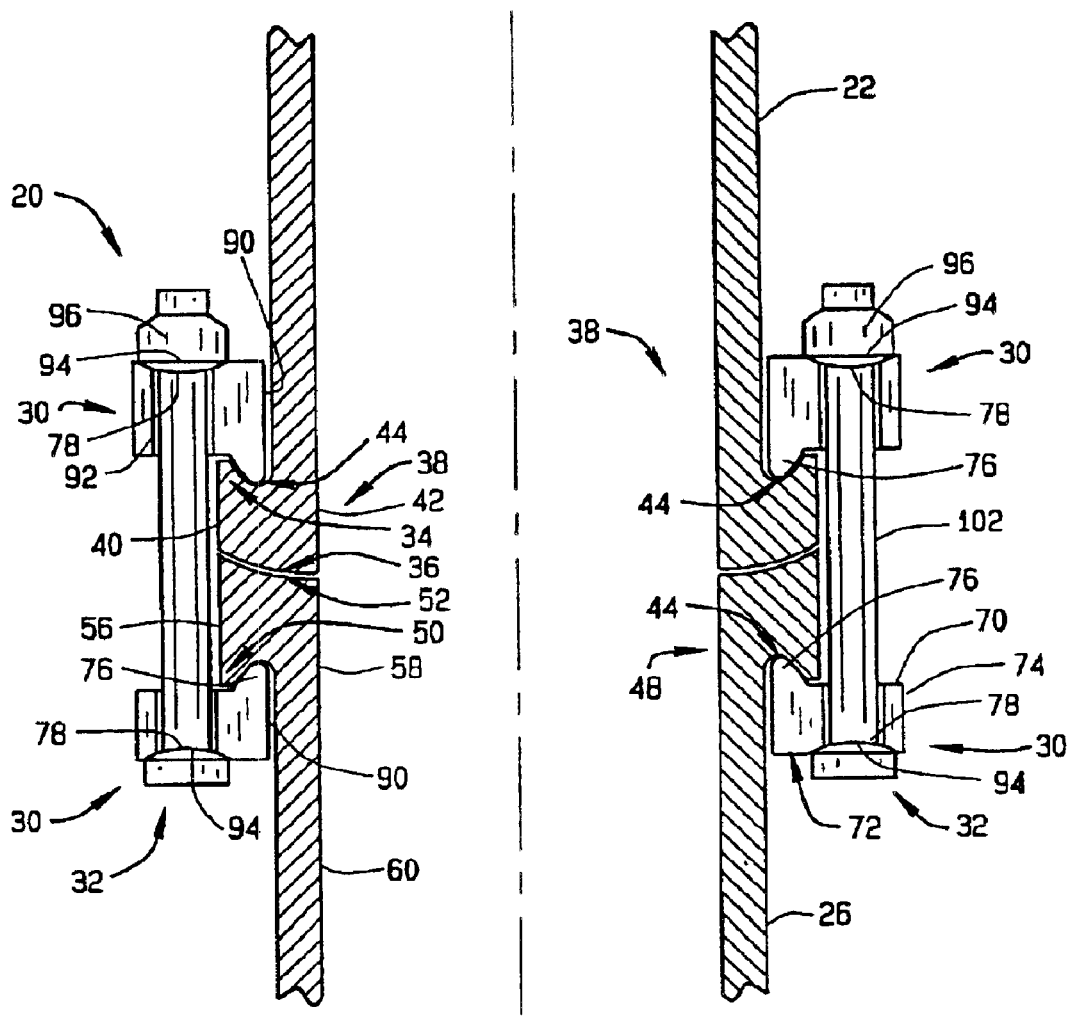
FIG. 2 is sectional schematic illustration of the pipe coupling assembly shown in FIG. 1.

FIG. 2 is a sectional schematic illustration of pipe coupling assembly 20. First pipe end 22 includes a first coupling member 38 that includes a flange 34 and a seat 36. Flange 34 includes a first surface 40, a second surface 42, and a plurality of pivot bearing seats or notches 44. Flange 34 is substantially cylindrical, and seat 36 extends between flange first surface 40 and flange second surface 42. Seat 36 has a substantially spherical convex shape. In one exemplary embodiment, first pipe end 22 is configured to secure to second pipe end 26. In an alternative, first pipe end 22 is configured to secure to a nozzle junction (not shown).

Second pipe end 26 includes a second coupling member 48 that includes a flange 50 and a seat 52. Flange 50 includes a first surface 56, a second surface 58, and a plurality of pivot bearing seats or notches 44. Flange 50 is substantially cylindrical. Seat 52 extends between flange first surface 40 and flange second surface 42. Seat 52 has a substantially spherical concave shape. In the exemplary embodiment, second pipe end concave spherical seat 52 is sized to mate with first pipe end convex spherical seat 36.

Figure 3:
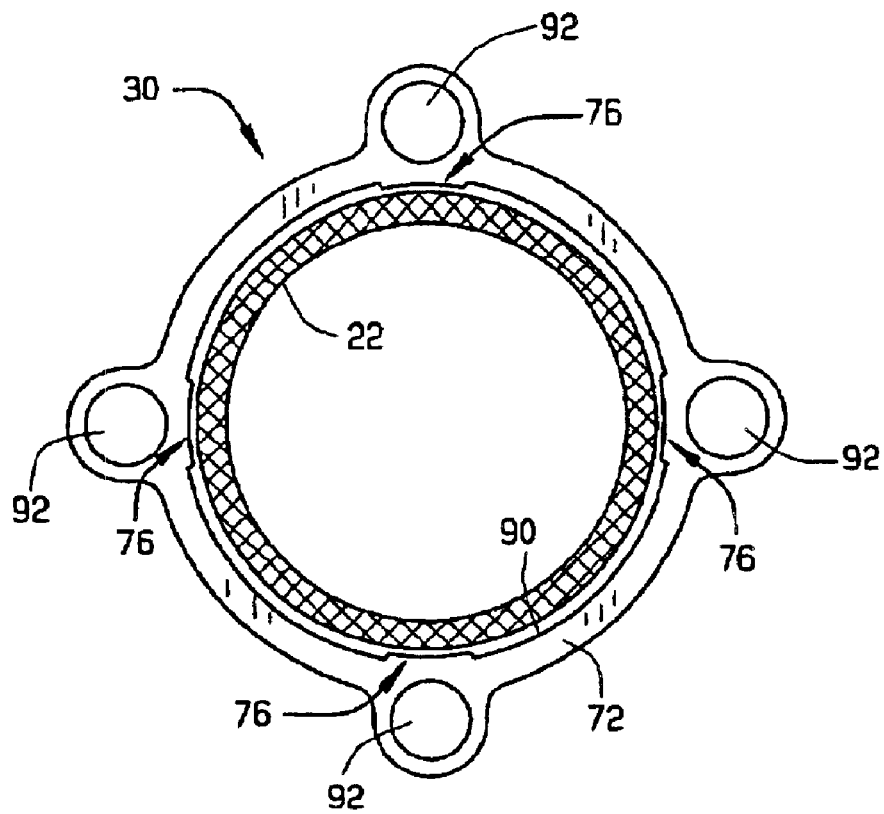
FIG. 3 is top view of the spring ring shown in FIG. 1.
Figure 4:
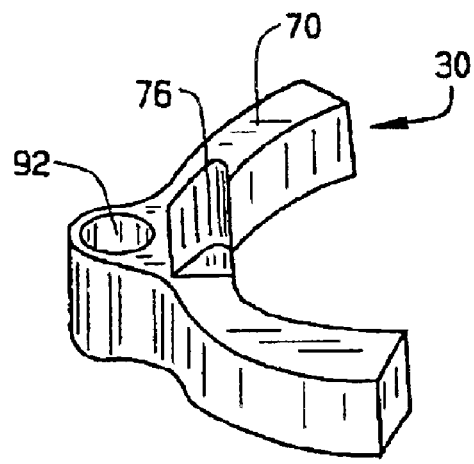
FIG. 4 is perspective view, of a quarter section, of the spring ring shown in FIG. 1.

FIG. 3 is a top view of spring ring 30, and FIG. 4 is a perspective view of a quarter section of spring ring 30. Referring to FIGS. 2, 3, and 4, each spring ring 30 includes a body 74 having a first surface 70 and an opposing a second surface 72. Spring ring 30 is fabricated from any suitable material not susceptible to intergranular stress corrosion cracking (IGSCC). In the exemplary embodiment, each spring ring 30 is fabricated from Type XM-19 stainless steel. Type XM-19 stainless steel provides high strength, permitting minimum size and weight, and resists galling between sliding surfaces.

Spring ring first surface 70 includes a plurality of pivot bearings 76 extending therefrom. In one exemplary embodiment, each spring ring 30 includes four pivot bearings 76. In other embodiments each spring ring 30 includes at least two pivot bearings 76. In one exemplary embodiment, pivot bearings 76 are equally spaced circumferentially around first surface 70. However, in other embodiments, pivot bearings 76 are unevenly spaced circumferentially around first surface 70. Pivot bearings 76 are sized to seat in flange pivot notches 44.

Spring ring body 74 includes a main bore 90 and a plurality of bolt bores 92 extending through body 74. Main bore 90 is sized and configured to receive a pipe ends 22 and 36. In one exemplary embodiment, body 74 has at least four bolt bores 92, and in alternative embodiments, spring ring body 74 has at least two bolt bores 92. In another embodiment, body 74 has a quantity of bolt bores 92 equal to the quantity of pivot bearings 76. Each bolt bore 92 is sized and configured to receive a bolt 32. Spring ring second surface 72 includes bolt bore seats 78 co-axially aligned with bolt bores 92.

Each fastener 32 includes a spherical bearing 94 and at each end. Spherical bearings 94 are sized to seat in bolt bore seats 78. Fastener 32 are sized to extend though spring ring bolt bores 92. Fasteners 32 also include a crimp nut 96 to prevent bolt 32 from loosening. In one exemplary embodiment, fasteners 32 are fabricated from any suitable material not susceptible to intergranular stress corrosion cracking (IGSCC). In the exemplary embodiment, fasteners 32 are fabricated from Type XM-19 stainless steel.

To join pipe sections 16 and 18, a first spring ring 30 is positioned on first coupling member 38 of first pipe section 16, and a second spring ring 30 is positioned on second coupling member 54 of second pipe section 18. Spring rings 30 are positioned so that pivot bearings 76 mate with respective pivot bearing notches 44 in clamping members 38 and 54. Bolts 32 are inserted through bolt bores 92 in spring bearings 30 with spherical bearings 94 at each end of bolts 32 engaging and mating with spherical bolt bore seats 78. Bolts are tightened, a pre-load force is applied, and crimp nuts 96 are crimped to bolts 32 to prevent loosening of bolts 32. Bolts 32 are pre-loaded during assembly to ensure that elastic deformation of flanges 74 is sufficient to maintain a seal seating force during a thermal distortion of the assembly. Pivot bearings 76 permit bolts 32 to twist rings 30 so that rings 30 act like springs to maintain bolt pre-load during thermal contraction of pipe 14. Bolt spherical bearings 94 permit freedom of rotation of flanges 74 relative to bolts 32.

While the invention has been described in terms of various specific embodiments, those skilled in the art will recognize that the invention can be practiced with modification within the spirit and scope of the claims.

What is claimed is:

1. A pipe coupling assembly comprising:
   a first pipe section comprising a first coupling member located at an end of said first pipe section, said first coupling member comprising a cylindrical flange and a spherical convex seat portion, said flange comprising a first plurality of pivot notches;
   a second pipe section comprising a second coupling member located at an end of said second pipe section, said second coupling member comprising a cylindrical flange and a spherical concave seat portion, said flange comprising a second plurality of pivot notches, said concave seat portion configured to receive said first convex seat portion; and
   a first and a second cylindrical spring ring, each said spring ring comprising:
   a body having a first surface and an opposing second surface, said body comprising a main bore and a plurality of bolt bores extending therethrough, said main bore configured to receive a pipe section therethrough, said bolt bore configured to receive a fastener therethrough;

a plurality of pivot bearings extending from said first surface, each said pivot bearing configured to engage a pipe section flange notch; and a plurality of bolt bore seats located in said second surface and coaxially aligned with said bolt bores, each said bolt bore seat configured to receive a first portion of a fastener.

2. A pipe coupling assembly in accordance with claim 1 wherein each said pivot bearing is substantially adjacent a respective bolt bore.

3. A pipe coupling assembly in accordance with claim 1 wherein a bolt extends through each said first and said second spring ring bolt bores to couple said first coupling member to said second coupling member.

4. A pipe coupling assembly in accordance with claim 3 wherein each said bolt comprises a spherical bearing at each end, said spherical bearings sized to mate with said bolt bore seat.

5. A pipe coupling assembly in accordance with claim 3 wherein each said bolt further comprises a crimp nut to prevent loosening of said bolt.

6. A pipe coupling assembly in accordance with claim 1 wherein said bolt bores have a diameter larger than a diameter of said bolts.

7. A method of joining two pipe sections in a nuclear reactor, a first pipe section comprises a first coupling member located at an end of the first pipe section, the first coupling member comprising a cylindrical flange and a spherical convex seat portion, the flange comprising a first plurality of pivot notches, a second pipe section comprising a second coupling member located at an end of the second pipe section, the second coupling member comprising a cylindrical flange and a spherical concave seat portion, the flange comprising a second plurality of pivot notches, the concave seat portion configured to receive the first convex seat portion, said method comprising:

seating a first spring ring on the first pipe section;

seating a second spring ring on the second pipe section; and coupling the first spring ring to the second spring ring with at least two bolts, each spring ring comprising:

a body having a first surface and an opposing second surface, the body comprising a main bore and a plurality of bolt bores extending therethrough, the main bore configured to receive a pipe section therethrough, the bolt bore configured to receive a bolt therethrough;

a plurality of pivot bearings extending from the first surface, each pivot bearing configured to engage a pipe section flange notch; and a plurality of bolt bore seats located in the second surface and coaxially aligned with the bolt bores, each bolt bore seat configured to receive a first portion of a fastener.

8. A method in accordance with claim 7 further comprising seating the first pipe section convex seat portion on the second pipe section concave seat portion.

9. A method in accordance with claim 8 wherein seating the first spring ring on the first pipe section flange comprises seating the first spring ring on the first pipe section flange with each pivot bearing of the first spring ring engaging a pivot notch of the first pipe section flange.

10. A method in accordance with claim 9 wherein seating the second spring ring on the second pipe section flange comprises seating the second spring ring on the second pipe section flange with each pivot bearing of the second spring ring engaging a pivot notch of the second pipe section flange.

11. A method in accordance with claim 10 further comprising coaxially aligning each first spring ring bolt bore with a corresponding second spring ring bolt bore.

12. A method in accordance with claim 10 wherein coupling the first and second spring rings comprises securing a bolt through each first spring ring bolt bore and the corresponding second spring ring bolt bore to couple the first and second coupling members.

13. A method in accordance with claim 12 wherein each bolt bore seat is substantially spherical and each bolt comprises at least one spherical bearing sized to mate with a bolt bore seat.

14. A method in accordance with claim 12 further comprising applying a pre-load to the bolts.

15. A method in accordance with claim 14 wherein coupling said first and second spring rings further comprises coupling at least one locking mechanism to each fastener.

* * * * *